United States Patent
Steegmüller et al.

(10) Patent No.: US 7,558,453 B2
(45) Date of Patent: Jul. 7, 2009

(54) ARRANGEMENT OF A MICRO-OPTICAL COMPONENT ON A SUBSTRATE, A METHOD FOR ADJUSTMENT OF THE ARRANGEMENT, AND AN OPTICAL SYSTEM WITH THE ARRANGEMENT

(75) Inventors: Ulrich Steegmüller, Regensburg (DE); Michael Kühnelt, Regensburg (DE); Thomas Schwarz, Regensburg (DE)

(73) Assignee: Osram Opto Semiconductors GmbH, Regensburg (DE)

( * ) Notice: Subject to any disclaimer, the term of this patent is extended or adjusted under 35 U.S.C. 154(b) by 30 days.

(21) Appl. No.: 11/141,163

(22) Filed: May 31, 2005

(65) Prior Publication Data
US 2005/0276542 A1   Dec. 15, 2005

(30) Foreign Application Priority Data
May 28, 2004   (DE)   ........................ 10 2004 026 132
Aug. 5, 2004   (DE)   ........................ 10 2004 038 093

(51) Int. Cl.
*G02B 6/26*   (2006.01)
(52) U.S. Cl. .............................. 385/52; 385/25; 385/31
(58) Field of Classification Search ........................ None
See application file for complete search history.

(56) References Cited

U.S. PATENT DOCUMENTS

| | | | |
|---|---|---|---|
| 5,095,517 A * | 3/1992 | Monguzzi et al. ............. | 385/90 |
| 5,638,169 A * | 6/1997 | Hollmann et al. ........... | 356/127 |
| 5,694,814 A | 12/1997 | Gardam | |
| 5,833,202 A | 11/1998 | Wolfgang et al. | |
| 6,571,041 B2 * | 5/2003 | Bourcier et al. ................ | 385/52 |
| 6,640,032 B2 * | 10/2003 | Kondo et al. ................... | 385/51 |
| 6,709,169 B2 * | 3/2004 | Rossi ............................ | 385/92 |
| 6,765,733 B1 * | 7/2004 | Igl et al. ....................... | 359/822 |
| 6,775,076 B2 * | 8/2004 | Do et al. ....................... | 359/819 |
| 7,062,133 B2 * | 6/2006 | Azimi et al. ................... | 385/52 |
| 2002/0126982 A1 | 9/2002 | Ishimura | |

FOREIGN PATENT DOCUMENTS

| | | |
|---|---|---|
| DE | 102 28 053 A1 | 1/2004 |
| FR | 2 716 013 | 2/1995 |
| JP | 51-126844 A | 11/1976 |
| JP | 62-175933 A | 8/1987 |
| JP | 7-311325 A | 11/1995 |
| JP | 08-122578 A | 5/1996 |
| JP | 09015447 A * | 1/1997 |
| JP | 2000 180658 A | 6/2000 |
| JP | 2002-42358 A | 2/2002 |
| WO | WO 84/04991 | 12/1984 |
| WO | WO 96/15467 | 5/1996 |
| WO | WO 01/93386 A1 | 12/2001 |

* cited by examiner

*Primary Examiner*—Omar Rojas
(74) *Attorney, Agent, or Firm*—Cohen Pontani Lieberman & Pavane LLP

(57) ABSTRACT

An arrangement of a microoptical component on a substrate, containing an adjustment connection which is provided between the component and the substrate and containing a first and a second connection element, which, matching one another, have first and second surfaces which are in contact and allow adjustment in different relative positions. This arrangement allows particularly simple adjustment of a microoptical component, for example, in the beam path of an optical component.

26 Claims, 6 Drawing Sheets

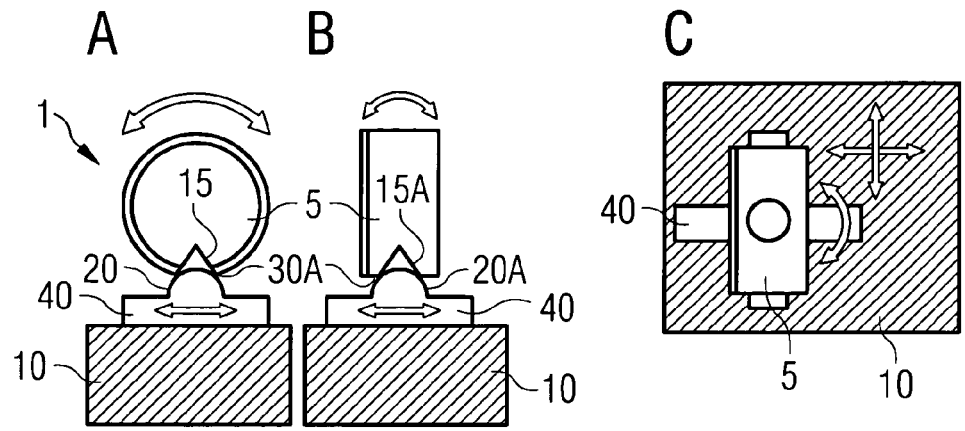
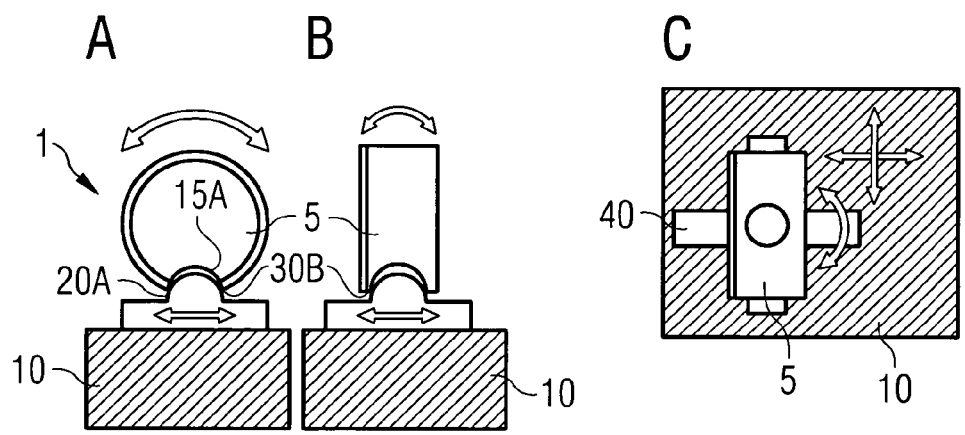
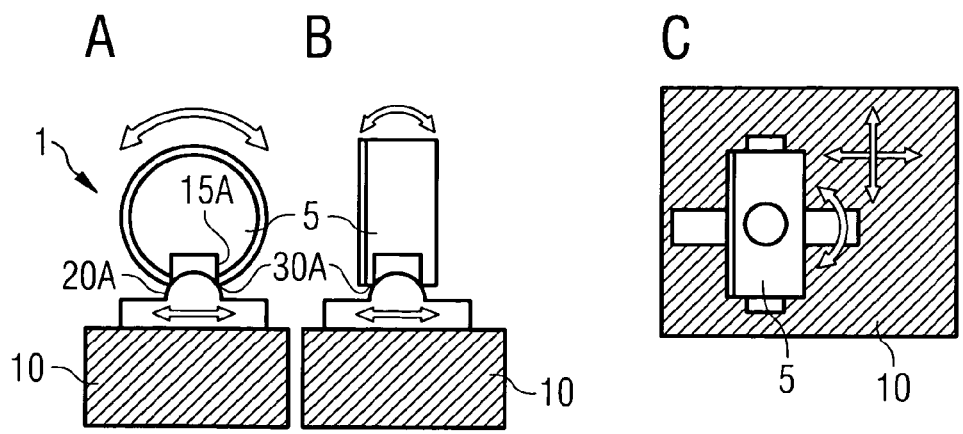

FIG 7
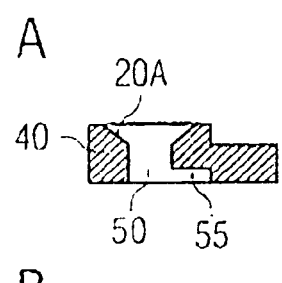
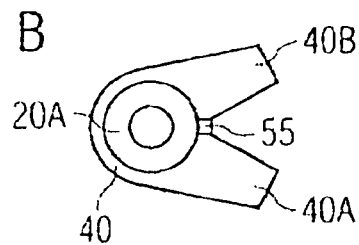
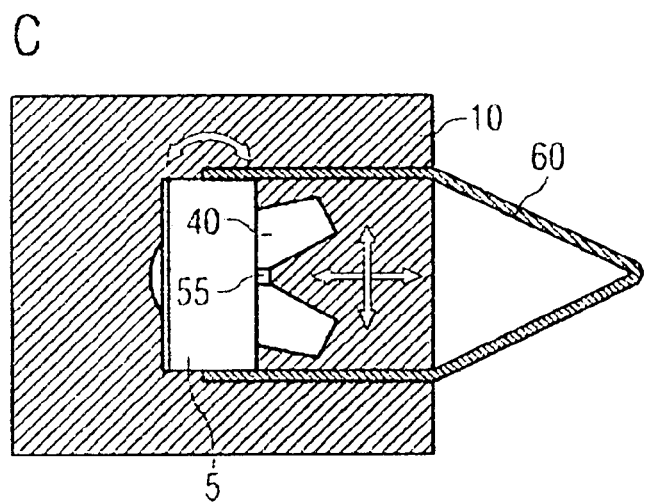
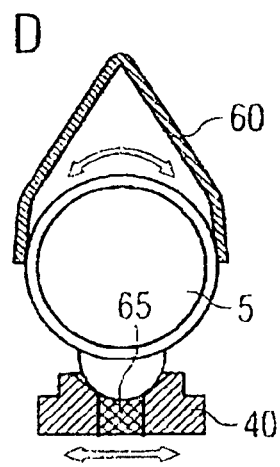
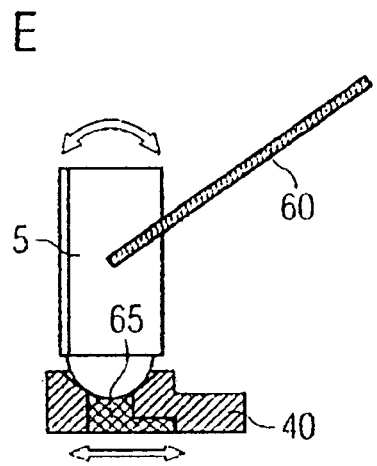
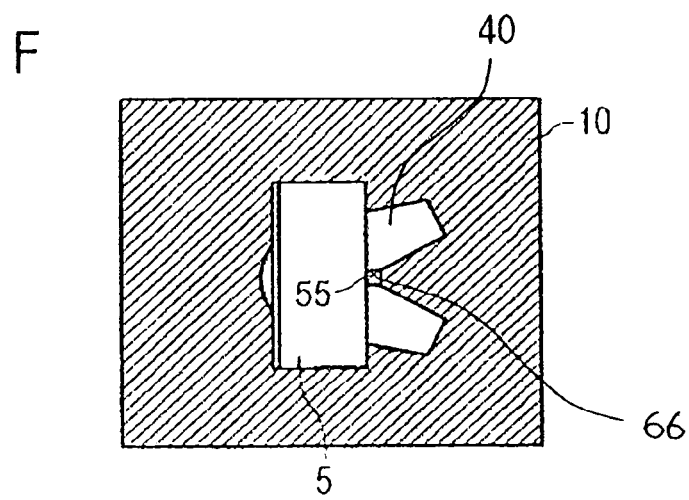

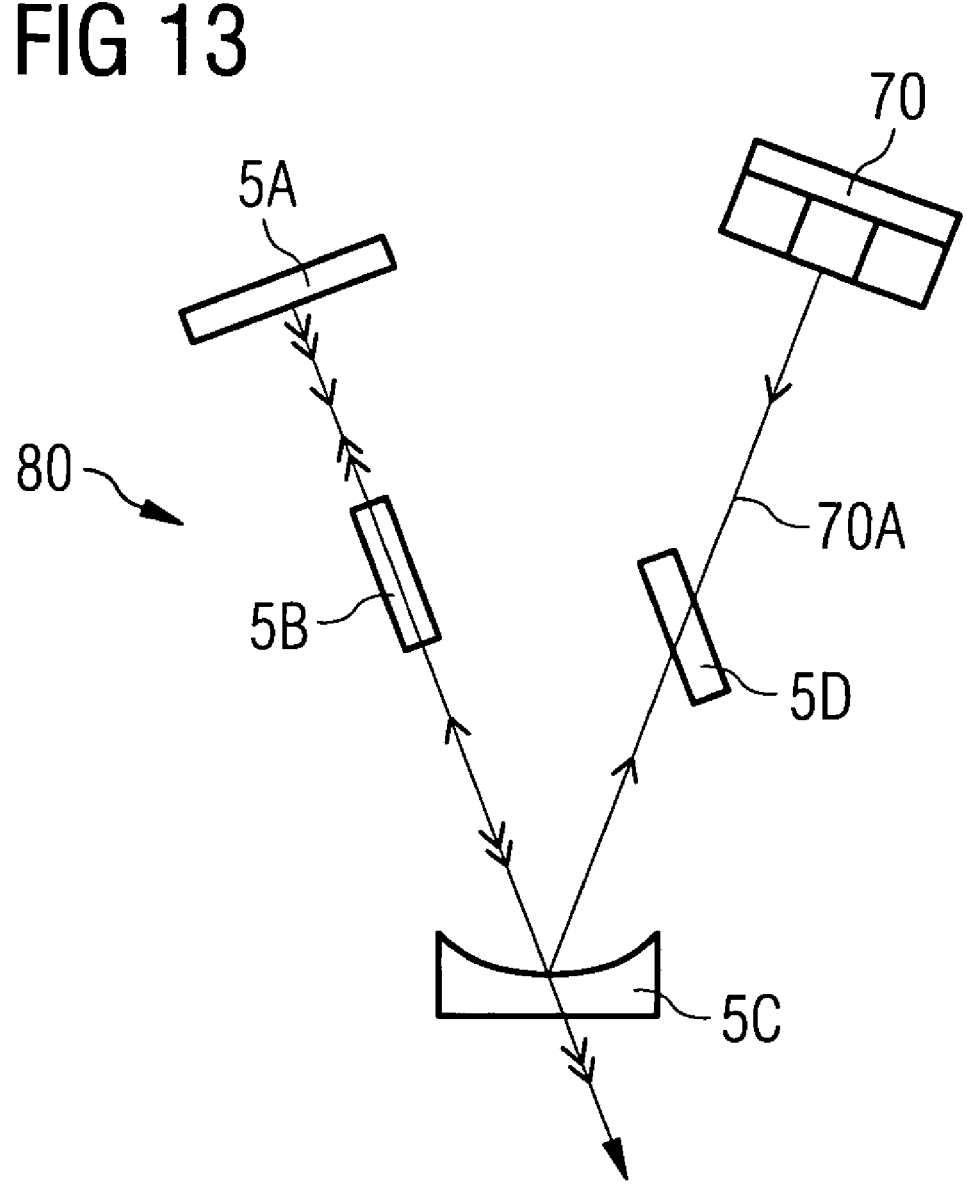

ARRANGEMENT OF A MICRO-OPTICAL COMPONENT ON A SUBSTRATE, A METHOD FOR ADJUSTMENT OF THE ARRANGEMENT, AND AN OPTICAL SYSTEM WITH THE ARRANGEMENT

CROSS REFERENCE TO RELATED APPLICATIONS

This Patent application claims the priority of German Patent Application Nos. 10 2004 026 132.6 and 10 2004 038 093.7, filed May 28, 2004 and Aug. 5, 2004, respectively, the disclosure content of which is hereby incorporated by reference.

FIELD OF THE INVENTION

This invention is related to an arrangement of a microoptical component on a substrate.

BACKGROUND OF THE INVENTION

WO 96/15467 A1 discloses a mechanical mounting system for microoptical elements, in which the respective microoptical element is fitted to a central platform which has at least three legs, which can be attached to the platform, via at least one hinge in each case. The microoptical element can be aligned on the platform by the platform being positioned accurately by adjustment of the at least three legs with e. g. the assistance of manipulation and robot systems. One disadvantage of this mounting system is, inter alia, that the at least three adjustable legs mean that three elements must be positioned relative to one another, so that only relatively complex adjustment is possible by means of this mounting system.

SUMMARY OF THE INVENTION

One object of the present invention is to provide an arrangement of a microoptical component on a substrate, a method for adjustment of the arrangement, and an optical system with the arrangement, which are improved with respect to the disadvantages mentioned above.

This and other objects are attained in accordance with one aspect of the invention directed to an arrangement of a microoptical component on a substrate, having an adjustment connection between the component and the substrate, containing a first and a second connection element, which, matching one another, have first and second surfaces which are in contact and allow adjustment in different relative positions.

The first connection element can contain a first surface, and the second connection element can contain a second surface. These two surfaces match one another and are in contact with one another, so that adjustment of the two connection elements with respect to one another is possible in a limited number of predetermined, different relative positions. These relative positions of the two connection elements with respect to one another can in this case be changed from one to the other by means of a first movement.

Thus, it is possible in a particularly simple manner to move the first and the second connection elements to different rotation and tilting positions with respect to one another. In contrast to the mechanical mounting system from WO 96/15467 A1, only an adjustable connection (first and second surfaces, which are in contact and match one another, of the first and second connection elements) is provided in an arrangement according to an embodiment of the invention, so that adjustment can be carried out particularly easily. In this case, it is possible for the first connection element to be mounted in the second connection element such that it can move.

The first and second surfaces, which match one another and are in contact, can in this case be designed such that (depending on the adjustment capability required) either only a free rotation of the two connection elements with respect to one another, only tilting of the two connection elements with respect to one another, or, in a combined form, a free rotation and tilting capability of the two connection elements with respect to one another is ensured.

The microoptical component can in this case be connected either to the first or to the second connection element. Correspondingly, the connection element which is not connected to the microoptical component is then connected to the substrate. This results in a particularly simple arrangement of the microoptical component on the substrate. Depending on the requirement for the arrangement, the connection between the microoptical component and the first or second connection element can be made directly (direct contact of the component with the connection element), or further elements may be interposed, which, for example, allow additional movement degrees of freedom. The same also applies in a corresponding manner to the connection between the connection element and the substrate.

In one arrangement according to an embodiment of the invention, the first surface of the first connection element is advantageously convex, and the second surface of the second connection element is concave. Since the convex and concave surfaces of the first and second connection elements match one another, this allows the two connection elements to rotate and be tilted particularly easily. For the purposes of this embodiment of the invention, convex surfaces are all outwardly curved surfaces, in which case these need not necessarily be circular arcs or ellipses, but a large number of other outwardly curved surfaces may also be used, for example with bulges in the form of pins, as long as they ensure capability to rotate, and possibly tilt, freely. The convex surface may also comprise planar surface areas at an angle to one another, which, for example, are in the form of polygons.

In a corresponding manner, concave surfaces are also all inwardly curved surfaces, and, in this case, by way of example, may be not only spherical recesses but also cylindrical holes, conical envelope surfaces and rectangular grooves (see, for example, FIGS. 1, 9 and 10).

Depending on the configuration of the first surface of the first connection element and the second surface of the second connection element, either point, line or flat contacts may be formed between the two surfaces. Point contacts may, for example, be produced by mounting a rectangle in a hollow segment. Point contacts are also produced when a convex surface is in contact with a concave surface, with the radii r being subject to the condition: $r_{concave} > r_{convex}$. Line contacts occur, for example, in an arrangement as shown in FIG. 1, when the second connection element has a hemispherical second surface and the first connection element, as the first surface, has a conical envelope surface. Line contacts between the first and the second surface may also be produced, for example, by using convex and concave surfaces in the form of spherical outward or inward bulges, which have different curvatures (see, for example, FIG. 2). Flat contacts between the first and the second surface occur, inter alia, when both surfaces are designed to be complementary to one another, as is illustrated by way of example in FIG. 8. In this case, however, it is also possible for the inwardly curved concave surface additionally to have indentations as well, which, for example, can be used to hold fixing agents, for example adhesives.

The microoptical component can be adjusted particularly easily if the center point of the free capability of the component to rotate and/or tilt coincides with the center point of the optically effective area of the microoptical component.

It is also particularly advantageous for the arrangement according to the invention to be self-supporting, that is to say for the positions (which are set by means of the adjustment process) of the first and second connection elements with respect to one another to be fixed without any further supports. This can be achieved, for example, by providing a fixing agent which, particularly advantageously, fixes the two first and second surfaces, which are in contact, relative to one another. This fixing therefore also results in a stable relative position between the first and second connection elements. The fixing agent is advantageously applied to one surface or both surfaces of the first and second connection elements. On the other hand, it is possible to achieve a self-supporting arrangement according to the invention even without any fixing agents. This can be achieved, for example, by the second connection element at least partially surrounding the first connection element, thus resulting in a particularly robust "hinged joint" between the first and the second connection element. Furthermore, the first and second surfaces, which are in contact, of the first and second connection elements may be designed in such a way that a particularly high degree of friction occurs between the two connection elements, so that relatively permanent fixing and a self-supporting characteristic for an arrangement according to the invention can be achieved just as a result of the friction. By way of example, the first and second connection elements in one variant of an arrangement according to the invention may comprise metals, whose first and second surfaces are roughened, so as to achieve a particularly high degree of friction. Alternatively, it is also possible to use glass or silicon surfaces. These surfaces can likewise be roughened particularly easily by means of suitable prior treatments. Furthermore, the first and second connection elements may be composed of plastics, in which case the first and second plastic surfaces can then likewise be roughened particularly easily. A combination of all of the materials mentioned above is also possible. It is thus possible, for example, for first metal surfaces and second plastic surfaces to be in contact with one another.

In one embodiment of an arrangement according to the invention, the first connection element is in the form of a sphere or a hemispherical segment with a corresponding spherical surface as the first surface. Connection elements such as these allow a free rotation and tilting capability particularly easily by virtue of their spherical shapes, depending on the shape of the second connection element.

The second connection element advantageously has a hollow spherical segment with a corresponding surface as the second surface, in which the first connection element is mounted. A hollow spherical segment in this case likewise allows the first and the second connection elements to rotate and tilt freely with respect to one another, depending on the shape of the first connection element, by virtue of its specific shape.

A ball joint is particularly advantageous, in which a spherical segment or hemispherical segment is mounted as the first connection element in a hollow spherical segment as the second connection element. A ball joint such as this allows particularly robust mounting with a free rotation and tilting capability at the same time.

Either the first or the second connection element may be arranged on a first submount, which allows additional relative movement between the submount and the substrate. In this case, two additional degrees of freedom of translation are advantageously made possible over the surface of the substrate (see, for example, FIGS. 1 to 6). In this case, the connection element is generally arranged on the moving first submount, which is located adjacent to the substrate. These relative movements, which are made possible by the first submount, can be changed to one another by a second movement.

The first submount may in this case additionally have a cavity which may be a part of the surface of the connection element which is arranged on this first submount. This cavity may be used, for example as shown in FIG. 7, to hold a fixing agent, for example adhesives or solder metals, which allow the first and the second connection elements to be fixed with respect to one another.

In addition, a channel can be provided in the first submount, which extends from the surface of the first submount to the surface of the connection element which is arranged on the first submount. A channel such as this is likewise illustrated, by way of example, in FIG. 7. This channel can be used for subsequent application of a fixing agent to the contact points between the two surfaces, once adjustment of the microoptical component on the substrate has taken place by adjustment of the specific relative positions of the two connection elements with respect to one another. Furthermore, the channel can be used to allow excess fixing agent to emerge while being applied, before the two surfaces are connected and adjusted.

Further degrees of freedom for the movement of the microoptical component on the substrate can be provided by, in a particularly advantageous manner, providing a second submount on which the microoptical component is arranged. This submount then allows movement of the microoptical component relative to the surface of the substrate while maintaining a fixed relative position between the first and the second connection elements. One example of an arrangement according to the invention such as this is illustrated in FIG. 11. An arrangement such as this allows the height of the microoptical component above the substrate surface to be adjusted freely, in addition to the degrees of freedom of rotation, tilting and translation over the surface. In order to make the adjustment of the microoptical component particularly flexible, the component can additionally be mounted on the second submount such that it can be rotated and/or tilted freely.

If one of the two first or second connection elements is in contact with the microoptical component, then there are a number of possible ways to fit this connection element to the microoptical component. For example, it is possible to arrange the microoptical component in a housing or a socket which comprises the connection element. The housing or the socket may, for example, be composed of glass, so that the connection element can then be formed from the housing or socket particularly easily by grinding, drilling or milling. Alternatively, it is possible to form the housing or the socket from a plastic part and, in this case, to form the connection element with its respective contact surface for the other connection element in a corresponding manner in one process step. Alternatively, it is also possible to produce one of the connection elements from moldings, for example injection-moldings, and then to attach this to the microoptical component by a joining process, for example adhesive bonding. If one of the connection elements is arranged on the first substrate, this submount and the connection element can advantageously be formed in one step by stamping, injection-molding or die-casting techniques from metals or plastic. In this case, casting and stamping techniques are also feasible and, for example, can also be used in the case of types of glass. However, alternatively, separate manufacture of the connection element and of the first submount is also possible, with this connection element then being retrospectively attached to the submount.

At least one of the surfaces of the first or second connection element may have a metal layer. This metal layer may, for example, be used to fix a relative position between the first and the second connection element after adjustment of the microoptical component on the substrate. The fixing process can be carried out by fusing on the metal layer. For this purpose, the metal layer is advantageously a solder metal which can be melted particularly easily at low temperatures. However, both the first surface of the first connection element and the second surface of the second connection element are advantageously provided with a metal layer, which then results, particularly advantageously, in a close-pitch tooth system on both surfaces, and thus in fixing, during the fusion process of these metal layers.

Instead of a metal or a solder metal as the fixing agent, it is also possible, for example, to use adhesives. These can be applied to the first and/or second surface of the connection elements even before the final adjustment of the microoptical component on the substrate, and can be cured, for example by means of heating or UV curing, once the adjustment process has been carried out.

The microoptical component of an arrangement according to the invention in this case generally has extents of less than about 13 mm, and preferably of less than about 5 mm. Dimensions of less than about 1 mm are likewise possible. The microoptical component will have an extent of between 1 to 5 mm for most applications. In this case, it may comprise laser mirrors, optical filters, polarization components, frequency doublers, delay platelets, deflection mirrors, prisms, LEDs, semiconductor lasers, photodiodes or lenses.

Another aspect of the invention is directed to a method for adjustment of a microoptical component on a substrate, with the following method steps: (A) providing an arrangement of a microoptical component and a substrate having an adjustment connection between the component and the substrate, the adjustment connection containing a first and a second connection element, which, matching one another, have first and second surfaces which are in contact and allow adjustment in different relative positions, and B) adjusting the microoptical component by variation of the positions of the connection elements with respect to one another.

In an optional method step C), after the method step B), the first and second connection elements can be fixed. This is particularly advantageous, for example, when the arrangement according to the invention is not already intrinsically self-supporting. Fixing can be carried out, for example, by using a fixing agent to fix the first and second surfaces to one another. Alternatively, additional supports can also be introduced to stabilize the arrangement.

In the method step B), the microoptical component can be adjusted particularly easily and quickly by means of a gripping arm which, for example, is a component of a robot-assisted system.

In one embodiment of a method according to the invention, a curable adhesive is applied in the method step A) to at least one of the mutually opposite surfaces of the first or second connection element, and is cured in the method step C)—after the adjustment of the component on the substrate in the method step B). As already described above, this curing process can be carried out, for example, by means of UV radiation or by means of heating, depending on the characteristic of the adhesive.

As an alternative to the use of an adhesive for fixing, it is also possible in the method step A) to produce a metal layer on at least one of the mutually opposite first and second surfaces of the connection elements, and then to fuse on the metal layer in the method step C), after the adjustment process.

BRIEF DESCRIPTION OF THE DRAWINGS

FIGS. 1 to 6 show embodiments of an arrangement according to the invention with a first submount, which can move over the substrate, in a front view, side view and plan view.

FIGS. 7A-7F show further embodiment of an arrangement according to the invention, with a specially shaped submount, in various positions.

FIG. 13 shows an optical system which contains at least one arrangement according to an embodiment of the invention.

DETAILED DESCRIPTION OF THE DRAWINGS

Figure 4:
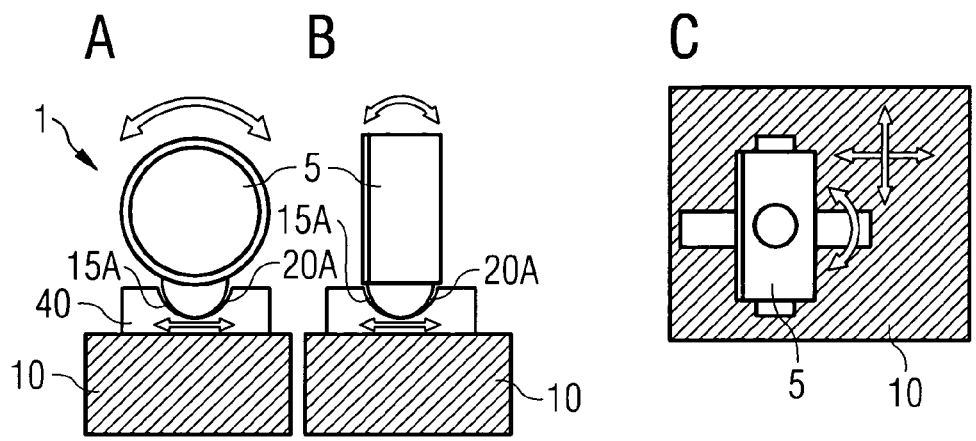

The respective figure elements A in FIGS. 1 to 6 and 8 to 10 which will now be described show a front view of the arrangement, the figure elements B show a side view, and the figure elements C show a plan view of the respective arrangements according to the invention.

In this case, FIG. 1 shows the arrangement 1 of a microoptical component 5 on a substrate 10. The connection between the microoptical component 5 and the substrate 10 is in this case made via a first connection element 15 and a second connection element 20. The first connection element 15 is in this case produced from the microoptical component 5, and contains a conical surface 15A as a bearing (first surface). In this case, the second connection element 20 is mounted in this conical surface 15A, and in this case has a convex spherical contact surface 20A as the second surface. In this case, line or annular contacts 30A are formed between the conical surface 15A and the spherically convex curved surface 20A. The second connection element 20 is in this case formed integrally together with a first submount 40, for example by means of injection molding. The submount 40 with the second connection element 20 can in this case be moved freely over the substrate 10 (double-headed arrow), and can be fixed on it, for example by means of soldering or adhesive bonding. Anodic bonding is likewise possible, for example glass on silicon or glass on glass, silicon-fusion bonding and welding. The curved double-headed arrow in FIG. 1A in this case indicates possible tilting of the microoptical component 5, which can be achieved by means of this support.

The side view in FIG. 1B shows that, in addition to tilting sideways as shown in FIG. 1A, tilting can also take place forwards and backwards (double-headed arrow). The view shown in FIG. 1C shows that, in addition to the two degrees of freedom of translation over the substrate 10 (crossed double-headed arrows), an arrangement according to the invention also allows rotation (curved double-headed arrow) of the component 5 on the submount 40. The white circle in this case indicates the support, which actually cannot be seen, for the second connection element in the first connection element.

FIG. 2 shows a further embodiment of an arrangement according to the invention, in which the first surface 15A of the first connection element 15 is a concave curved spherical surface, and the second surface 20A of the second connection element 20 is a convex curved spherical surface. The convex and concave curved surfaces in this case have different radii of curvature, thus resulting in line contacts 30B between the first surface 15A and the second surface 20A. Point contacts are also possible when a convex surface is in contact with a concave surface, provided that the radii r satisfy the relationship: $r_{concave} > r_{convex}$.

In the arrangement shown in FIG. 3, the first surface 15A is in the form of a cylindrical hole, and the second surface 20A is in the form of a convex curved spherical surface. A combination of first and second surfaces such as this results, in a similar way to that in FIG. 1, in line or annular contacts 30A between the first surface 15A and the second surface 20A.

Figure 5:
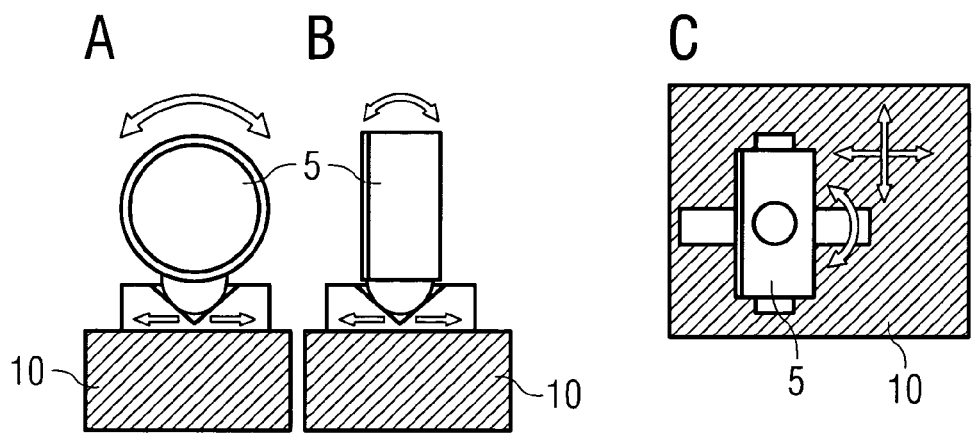
Figure 6:
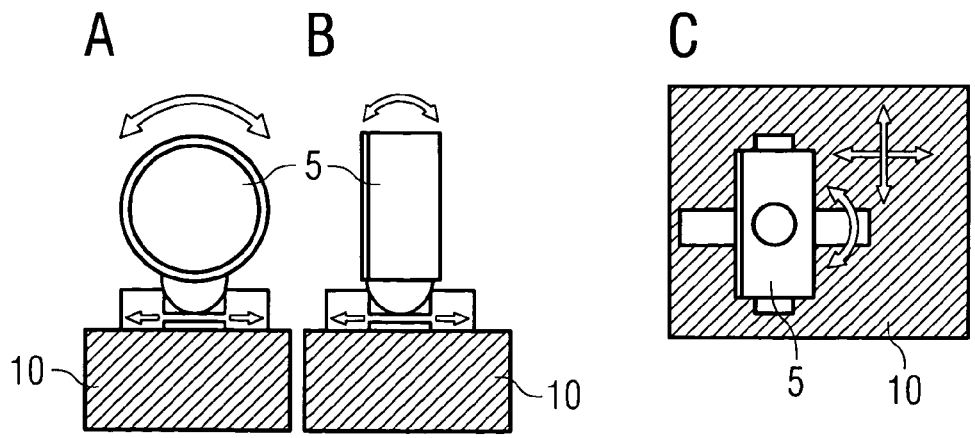

In contrast to FIGS. 1 to 3, in which the second connection element surrounds a convex outwardly curved spherical surface on a first submount 40, FIGS. 4 to 6 show submounts 40 whose second connection elements have spherical connection surfaces 20A with concave inward curvature. These second surfaces 20A may in this case have concave spherical curvature, as illustrated in FIG. 4, although may have conical envelope surfaces as shown in FIG. 5 or cylindrical holes as shown in FIG. 6.

FIG. 7A shows a side view of one embodiment of a first submount 40 with a second connection element 20, whose second surface 20A is concave and conical. This surface in this case merges directly into a cavity 50, via which it is connected to a channel 55. This channel 55 extends, as illustrated in the plan view in FIG. 7B, to the surface of the first submount between two limbs 40A, 40B of the first submount 40. Once the first and second connection elements have been adjusted, this channel 55 can be used to fix them by subsequent application of an adhesive. A further function of this channel 55 may be to allow excess fixing agent 66 (FIG. 7F) to emerge. The plan view in FIG. 7C in this case shows how the optical component 5 can be adjusted by means of a gripping arm 60 on the first submount 40 by means of rotation (curved double-headed arrow). The front view in FIG. 7D and the side view in FIG. 7E show how lateral tilting movements and/or forwards or rearwards tilting movements of the microoptical component 5 can additionally be carried out by means of different positions of the gripping arm 60 (curved double-headed arrows). In this case, a fixing agent 65 (for example solder metal or adhesive) can be arranged in the cavity 50 even during the adjustment of the microoptical component 5, ensuring that the first and second connection elements are fixed by means of fusion (solder metal) or curing (adhesive) once the adjustment process has been carried out. FIG. 7F shows the first submount 40 fixed to the substrate 10 wherein excess fixing agent 66 is allowed to emerge from channel 55.

Figure 8:
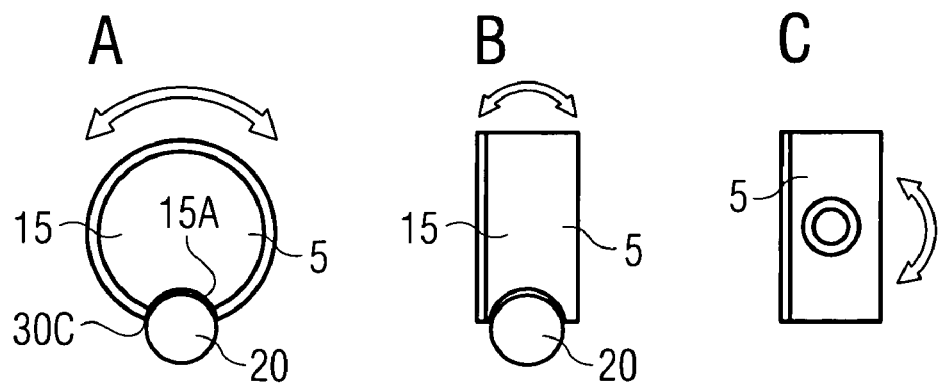
FIGS. 8 to 10 show arrangements according to other embodiments of the invention, without a submount, in the form of a front view, side view and plan view.
Figure 9:
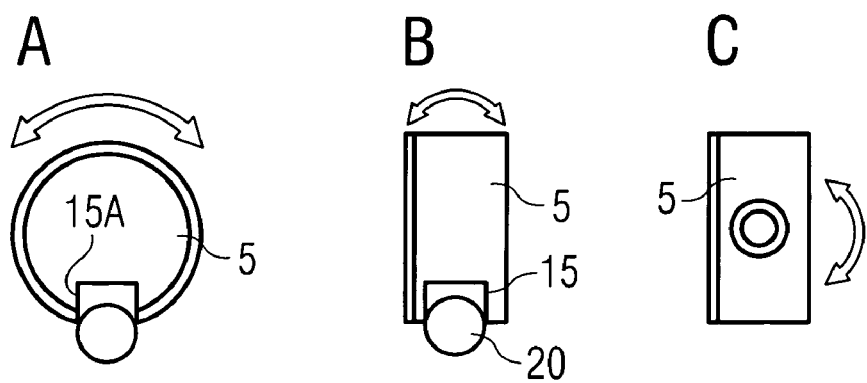
Figure 10:
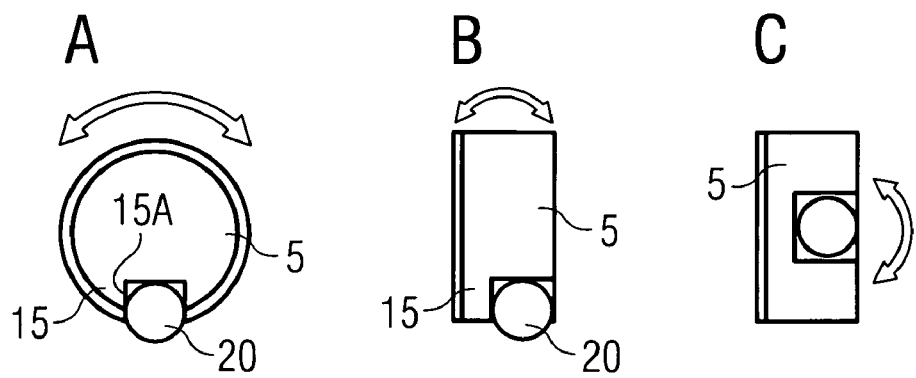

FIGS. 8 to 10 show a second connection element 20 in the form of a microball, which can be mounted directly on a substrate 10. Thus, in these embodiments, mobility over the surface of the substrate by means of a submount 40 is no longer possible.

In FIGS. 8A to 8C, the first connection element 15 in this case contains a hollow sphere with a corresponding hollow spherical surface 15A as the first surface, thus resulting in a ball joint, which allows a free rotation and tilting capability, particularly easily. A self-supporting arrangement can result in this case with an appropriate configuration of the first and second surfaces of the hollow sphere and of the microball of the second connection element 20.

FIG. 9 shows a combination of a cylindrical hole 15 with a first surface 15A, and a microball 20.

FIG. 10 shows a combination of a rectangular groove 15 with a corresponding surface 15A as the first connection element, and a microball 20 as the second connection element.

Figure 11:
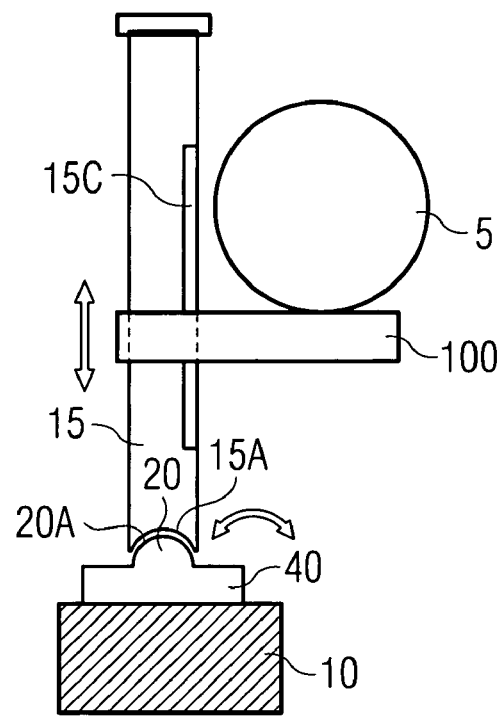
FIG. 11 shows one embodiment of an arrangement according to the invention which contains a first and a second submount.

In FIG. 11, a first submount 40 on which a second connection element 20 with a convex spherical surface 20A is formed is combined with a second submount 100. In this case, as in all of the other previous embodiments, the first connection element 15 is mounted via a surface 15A, with convex spherical curvature, in the second connection element 20 such that it can move. In this case, the second submount 100, to which the microoptical component 5 is attached, is mounted on this first connection element 15 via a guide rail 15C such that it can move relative to the surface of the substrate 10. An arrangement such as this still allows relative positioning of the microoptical component 5 relative to the surface of the substrate 10 (straight double-headed arrow) as soon as the first connection element 15 has assumed a fixed relative position with respect to the second connection element 20. In the same way as the first and second contact surfaces 15A and 20A, the contact surface between the first connection element 15 and the second submount 100 may also in its own right be self-supporting, or may be fixed by means of a fixing agent once the adjustment process has been carried out.

Figure 12:
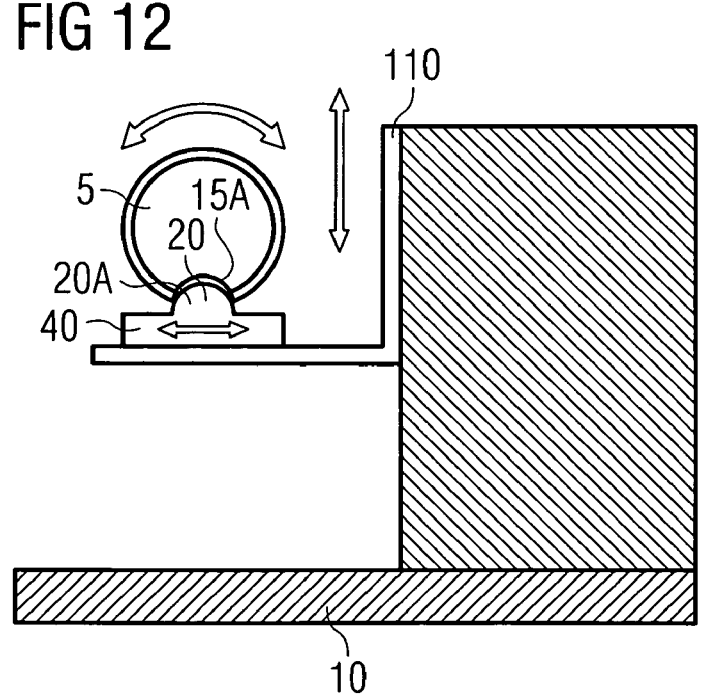
FIG. 12 shows a further embodiment of an arrangement according to the invention, which can be moved at right angles to the surface of the substrate.

FIG. 12 shows a further arrangement which allows relative positioning of the microoptical component 5 relative to the surface of the substrate 10. The microoptical component 5 is in this case arranged on a carriage 110, which can move at right angles to the surface, via the first submount 40, on which it is mounted such that it can move. This possible movement is indicated by the vertical double-headed arrow. Instead of the first and second surfaces 20A, 15A which are shown in FIG. 12, it is also possible for this arrangement to use the other surface pairs 20A, 15A, which are illustrated in the other figures.

Arrangements according to the invention, in particular the arrangements shown in FIGS. 1 to 12, may be a component of an optical system 80, a plan view of which is shown in FIG. 13. This optical system in this case contains an optical component 70, for example a laser, in particular a semiconductor disc laser as described in co-pending U.S. Ser. No. 09/824,086 of which the entire disclosure is hereby incorporated by reference. This optical component 70 produces a beam path 70A by emission of radiation. An arrangement according to the invention allows microoptical components 5A, 5B, 5C, 5D to be arranged in the beam path 70A, and if required to be adjusted exactly. The reference symbol 5A in this case denotes an arrangement according to the invention which contains an external mirror. The reference symbol 5C in this case denotes an arrangement according to the invention which contains a partially reflective concave deflection mirror for deflection of the beam path 70A. The arrangements which are annotated 5B and 5D in this case contain frequency doublers (5B) and frequency-selective elements (5B), respectively.

The invention is not restricted to the exemplary embodiments described here. Further embodiments are possible, for example with regard to the configuration of the two mutually matching first and second surfaces.

The scope of protection of the invention is not limited to the examples given hereinabove. The invention is embodied in each novel characteristic and each combination of characteristics, which particularly includes every combination of any features which are stated in the claims, even if this feature or this combination of features is not explicitly stated in the claims or in the examples.

We claim:

1. An arrangement of a microoptical component on a substrate, comprising:

an adjustment connection between the microoptical component and the substrate, comprising a first connection element and a second connection element, which, matching one another, have respective first and second surfaces which are in contact and allow adjustment of the microoptical component in different positions relative to a first submount by tilting forwards, backwards, and sideways, and by rotation, wherein either the first connection element or the second connection element is arranged on the first submount, which allows additional relative movement of the microoptical component with respect to the substrate and which has a channel which allows excess fixing agent to emerge.

2. The arrangement according to claim 1, wherein the first surface of the first connection element is convex, and the second surface of the second connection element is concave.

3. The arrangement according to claim 1, further comprising point contacts between the first and the second surface.

4. The arrangement according to claim 1, further comprising line contacts between the first and the second surface.

5. The arrangement according to claim 1, further comprising flat contacts between the first and the second surface.

6. The arrangement according to claim 1, wherein the first and the second surface are complementary to one another.

7. The arrangement according to claim 1, wherein the surface of the first connection element comprises a spherical surface or a part of a spherical surface.

8. The arrangement according to claim 7, wherein the second connection element comprises a hollow sphere in which the first connection element is mounted.

9. The arrangement according to claim 1, wherein the submount additionally comprises a cavity whose internal surfaces are a part of the surface of the connection element which is arranged on the first submount.

10. The arrangement according to claim 1, wherein a channel extending to the surface of the first submount is provided in the first submount, the channel extending to the surface of the connection element which is arranged on the first submount.

11. The arrangement according to claim 1, furthermore comprising a second submount on which the microoptical component is arranged, this submount allowing movement of the microoptical component relative to the surface of the substrate while maintaining the relative position between the first and the second connection element.

12. The arrangement according to claim 1, wherein the second connection element has a concave contact surface for supporting the first connection element with the following shapes: a conical casing surface, a cylindrical hole, or a rectangular groove.

13. The arrangement according to claim 1, wherein the first connection element is fitted to the microoptical component.

14. The arrangement according to claim 1, wherein at least one surface of the first or second connection element comprises a metal layer.

15. The arrangement according to claim 1, wherein the microoptical component is arranged in a housing which comprises either the first or the second connection element.

16. The arrangement according to claim 1, wherein the microoptical component comprises a laser mirror, an optical filter, polarization components, frequency doublers, delay platelets or a lens.

17. The arrangement according to claim 1, wherein the first and the second connecting elements are fixed relative to one another.

18. The arrangement according to claim 17, wherein the first and the second connection elements are fixed by means of a fixing agent which is selected from metal and adhesive.

19. A method for adjustment of a microoptical component on a substrate, comprising the following method steps:
a) providing an arrangement of a microoptical component and a substrate having an adjustment connection between the component and the substrate, the adjustment connection containing a first and a second connection element, which, matching one another, have first and second surfaces which are in contact and allow adjustment of the component in different positions relative to a first submount by tilting forwards, backwards, and sideways, and by rotation, wherein either the first or the second connection element is arranged on the first submount, which allows additional relative movement of the microoptical component with respect to the substrate and which has a channel which allows excess fixing agent to emerge,
b) adjusting the microoptical component by variation of the positions of the connection elements with respect to one another.

20. The method according to claim 19, wherein the first and second connection elements are fixed with respect to one another in a method step C) which takes place after B).

21. The method according to claim 20, wherein the microoptical component is adjusted by means of a gripping arm in a beam path of an optical component in the method step B).

22. The method according to claim 19, wherein a curable adhesive is applied to at least one of the mutually opposite surfaces of at least one of the first and the second connection element in the method step A), wherein the adhesive is cured in a method step C).

23. The method according to claim 19, wherein a metal layer is arranged on at least one of the mutually opposite surfaces of at least one of the first and the second connection element in the method step A), wherein the metal layer is fused on in a method step C).

24. An optical system, containing:
at least one optical component and
at least one arrangement according to claim 1, which is arranged in the beam path of the optical component.

25. The optical system according to claim 24, wherein the optical component comprises a laser, in particular a semiconductor disc laser.

26. An arrangement of a microoptical component on a substrate, comprising:
an adjustment connection between the microoptical component and the substrate, comprising a first and a second connection element, which, matching one another, have first and second surfaces which are in contact and allow adjustment of the microoptical component in different positions relative to a first submount by tilting forwards, backwards, and sideways and by rotation,
wherein either the first or the second connection element is arranged on a first submount, which allows additional relative movement of the microoptical component with respect to the substrate and which includes two limbs, the limbs being separate and distinct from the first and second connection elements.

* * * * *